US008955878B2

(12) United States Patent
Jang

(10) Patent No.: US 8,955,878 B2
(45) Date of Patent: Feb. 17, 2015

(54) AIRBAG FOR VEHICLE

(71) Applicant: HYUNDAI MOBIS Co., Ltd., Yongin-si, Gyeonggi-do (KR)

(72) Inventor: Rae Ick Jang, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/253,927

(22) Filed: Apr. 16, 2014

(65) Prior Publication Data

US 2014/0306434 A1    Oct. 16, 2014

(30) Foreign Application Priority Data

Apr. 16, 2013   (KR) .................. 10-2013-0041708

(51) Int. Cl.
*B60R 21/26*   (2011.01)

(52) U.S. Cl.
USPC ........................................................ 280/736

(58) Field of Classification Search
USPC ...................... 280/736, 739, 743.1, 743.2
See application file for complete search history.

(56) References Cited

U.S. PATENT DOCUMENTS

| 7,059,634 | B2 * | 6/2006 | Bossecker et al. | 280/739 |
| 7,328,915 | B2 * | 2/2008 | Smith et al. | 280/739 |
| 7,597,355 | B2 * | 10/2009 | Williams et al. | 280/739 |
| 7,628,422 | B2 * | 12/2009 | Fukawatase et al. | 280/739 |
| 7,658,407 | B2 * | 2/2010 | Ford et al. | 280/739 |
| 7,810,841 | B2 * | 10/2010 | Fukawatase et al. | 280/739 |
| 7,845,678 | B2 * | 12/2010 | Pausch | 280/735 |
| 8,191,925 | B2 * | 6/2012 | Williams | 280/739 |
| 8,646,808 | B2 * | 2/2014 | Williams | 280/743.2 |
| 8,696,022 | B2 * | 4/2014 | Fischer et al. | 280/739 |
| 8,746,736 | B2 * | 6/2014 | Mendez et al. | 280/736 |
| 2006/0071456 | A1 * | 4/2006 | Jenkins et al. | 280/728.2 |

FOREIGN PATENT DOCUMENTS

JP            07052746 A  *  2/1995

* cited by examiner

*Primary Examiner* — Faye M. Fleming
(74) *Attorney, Agent, or Firm* — Sherr & Jiang, PLLC

(57) ABSTRACT

The present invention relates to an airbag for a vehicle including: an inflator which discharges high-pressure gas; an airbag cushion which has a vent hole so as to discharge a part of the high-pressure gas; a vent hole cover which is installed to shield the vent hole; and an operating unit which allows the vent hole cover to shield the vent hole when a predetermined time has passed at the time of deploying the airbag cushion, and provides advantages in that the severity of a neck injury to an occupant is reduced, and regulation satisfaction by the United States New Car Assessment Program (US-NCAP) is improved.

12 Claims, 7 Drawing Sheets

(a)

(b)

(a)

(b)

INTERIOR OF AIRBAG CUSHION (a)

(b)

AIRBAG FOR VEHICLE

CROSS-REFERENCE TO RELATED APPLICATIONS

The present application claims priority to Korean Patent Application Number 10-2013-0041708 filed Apr. 16, 2013, the entire contents of which the application is incorporated herein for all purposes by this reference.

TECHNICAL FIELD

The present invention relates to an airbag for a vehicle, and more particularly, to an airbag for a vehicle, which may prevent an occupant from incurring a neck injury at the time of a vehicle collision accident, and may meet regulations by the United States New Car Assessment Program (US-NCAP).

BACKGROUND

In general, an airbag module is installed in a vehicle in order to protect a driver and an occupant when a collision accident occurs while the vehicle travels. The airbag module may be classified into a driver seat airbag that is provided in a steering wheel of the vehicle, which is disposed in front of a driver seat, in order to protect a driver, a front passenger seat airbag that is provided in a dashboard, which is disposed in front of a front passenger seat, in order to protect an occupant seated on the front passenger seat, and a variety of other airbag modules for protecting the occupant, and may be classified into a curtain airbag module, a seat airbag module, and the like depending on installation positions of the airbag module.

FIG. 1 is a side view illustrating an example of an appearance in which a front passenger seat airbag module for a vehicle according to the related art is deployed.

As illustrated in FIG. 1, a front passenger seat airbag module for a vehicle according to the related art is installed to be concealed in a dashboard, and includes an inflator 5 which generates high-pressure gas when a non-illustrated impact detection sensor senses set impulse at the time of a vehicle collision, and an airbag cushion 10 which is deployed toward an occupant seated on a front passenger seat while being filled with high-pressure gas.

The airbag cushion 10 is deployed at a very high speed toward the occupant seated on the front passenger seat while being guided by a wind shield glass within a range that the airbag cushion 10 does not break the wind shield glass when the airbag cushion 10 is deployed.

Meanwhile, in order to prevent the occupant from being injured due to the airbag cushion 10 when injection gas is excessively injected and the airbag cushion 10 is deployed toward the occupant seated on the front passenger seat at a high speed, a vent hole, which discharges a predetermined amount of gas from the inside to the outside of the airbag cushion 10 at the same time as being fully filled with gas for deployment, is formed in the airbag cushion 10. A plurality of vent holes may be formed in a side portion of the airbag cushion 10 except for a portion that is shielded by the wind shield glass. The reason is that in a case in which the vent hole is shielded by the wind shield glass, a function of the vent hole cannot be performed.

However, recently, high-pressure gas is excessively discharged through the plurality of vent holes to decrease internal pressure of the airbag cushion such that an original function of mitigating impact cannot be performed, and severity of a head injury to the occupant has increased. As illustrated in FIG. 1, in order to reduce the aforementioned head injury to the occupant, a device (hereinafter, referred to as "a vent hole opening unit 1", for convenience of description), which shields the vent hole using a vent hole cover, and then cuts a tether, which holds the vent hole cover, using force generated when the airbag cushion is fully deployed, such that the vent hole cover opens the vent hole, is added.

The front passenger seat airbag for a vehicle according to the related art has resolved the head injury to the occupant to a certain degree using the vent hole opening unit 1, but consequently, the severity of a neck injury to the occupant, which is an important item in the United States New Car Assessment Program (US-NCAP), is rather decreased.

In order to apply the vent hole opening unit 1, the general vent hole 2 needs to be formed to have a small size in order to prevent internal pressure of the airbag cushion from being excessively decreased due to another vent hole (referred to as 'a general vent hole 2' for convenience of description) which is irrelevant to the vent hole opening unit 1. However, at the time of an unbelted regulation test (that is, this test is performed without fixing a dummy using a seat belt), actually, the vent hole opening unit 1 is not frequently operated, and the internal pressure of the airbag cushion 10 is excessive because of an influence of the general vent hole 2 having a small size, which may cause a head injury and a neck injury to the occupant. On the contrary, when the vent hole opening unit 2 is operated, there is a problem in that internal pressure of the airbag cushion 10 becomes significantly low.

The reason is that despite the fact that a maximum time point when the occupant has a head injury precedes a maximum time point when the occupant has a neck injury, the vent hole opening unit is operated at the same time when the airbag cushion 10 is fully deployed at the time of the unbelted regulation test.

SUMMARY

The present invention has been made in an effort to provide an airbag for a vehicle which may reduce the severity of a neck injury to an occupant by shielding a vent hole at a maximum time point when the occupant has a neck injury immediately before an airbag cushion is fully deployed, and maintaining internal pressure of the airbag cushion, and may reduce both the severity of head and neck injuries to the occupant so as to meet regulations by the United States New Car Assessment Program (US-NCAP).

Technical problems of the present invention are not limited to the aforementioned technical problems, and other technical problems, which are not mentioned above, may be clearly understood by those skilled in the art from the following descriptions.

An exemplary embodiment of the present invention provides an airbag for a vehicle, including: an inflator which discharges high-pressure gas; an airbag cushion which has a vent hole so as to discharge a portion of the high-pressure gas; a vent hole cover which is installed to shield the vent hole; and an operating unit which allows the vent hole cover to shield the vent hole when a predetermined time has passed from beginning of deploying the airbag cushion.

The vent hole cover may be formed in a tube shape so that high-pressure gas with which the airbag cushion is filled is discharged to the outside through the vent hole before the vent hole in the airbag cushion is shielded.

The operating unit may include: a cylinder; a piston which is movably installed in the cylinder so as to allow the vent hole cover to shield the vent hole; and a piston moving means which moves the piston.

The piston moving means may be an explosive embedded in the cylinder.

The vent hole cover and the piston may be connected by a tether.

The tether may be movably installed along an inner circumferential surface of the vent hole cover such that the tether tightens the vent hole cover by movement of the piston.

A tether cover may be attached to the vent hole cover, the tether may be movably disposed between the tether cover and the vent hole cover, and a tether hole may be formed in the tether cover so that the tether passes through the tether hole.

A guide member may be installed in the cylinder so as to guide the tether in a direction in which the piston is moved.

The guide member may be inclinedly installed toward the direction in which the piston is moved.

A support member may be installed at a region of the airbag cushion which is positioned between the vent hole cover and the guide member, and guide the tether while supporting the tether.

The support member may have a hole through which the tether movably passes.

The vent hole cover may be installed by being sewn on a region of the airbag cushion which corresponds to an outer circumference of the vent hole.

Specific items of other exemplary embodiments are included in the detailed description and the drawings.

According to the airbag for a vehicle of the present invention, there are one or more effects as follows.

Firstly, the explosive ignites at the optimum time to shield the vent hole of the airbag cushion, thereby improving stability and controllability of the airbag deployment.

Secondly, the airbag for a vehicle according to the present invention may precisely control the operation of shielding the vent hole, thereby reducing the severity of head and neck injuries to the occupant.

The effects of the present invention are not limited to the aforementioned effects, and other effects, which are not mentioned above, will be clearly understood by those skilled in the art from the claims.

DETAILED DESCRIPTION

Figure 1:
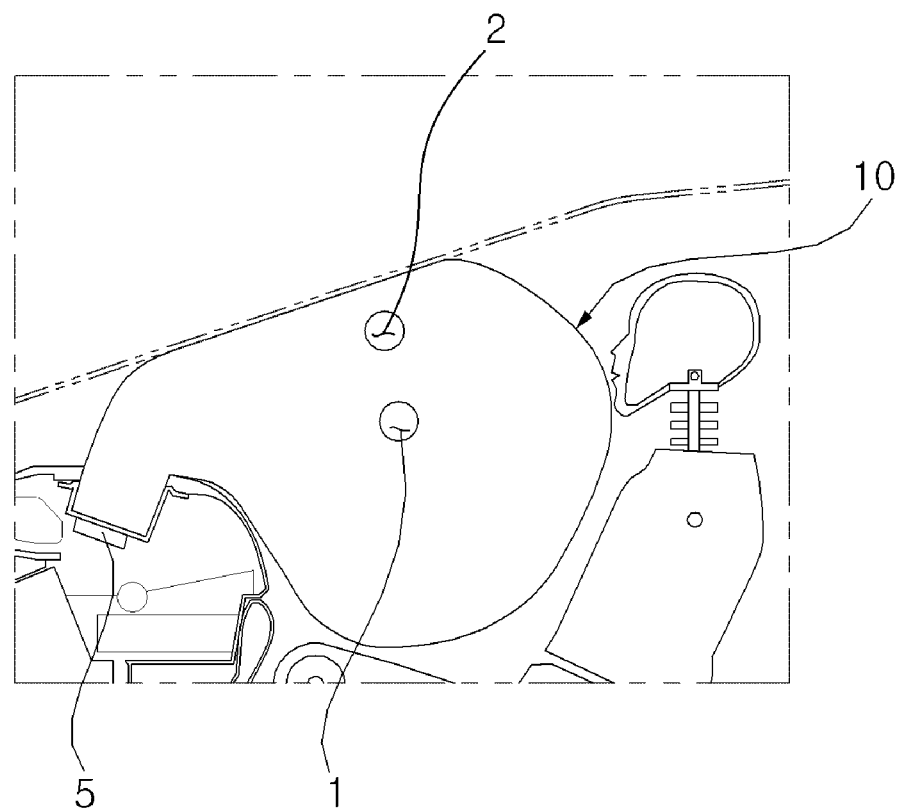
FIG. 1 is a side view illustrating an example of an appearance in which an airbag for a vehicle according to the related art is deployed.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, the present invention will be described with reference to the drawings for explaining an airbag for a vehicle according to exemplary embodiments of the present invention.

Figure 2:
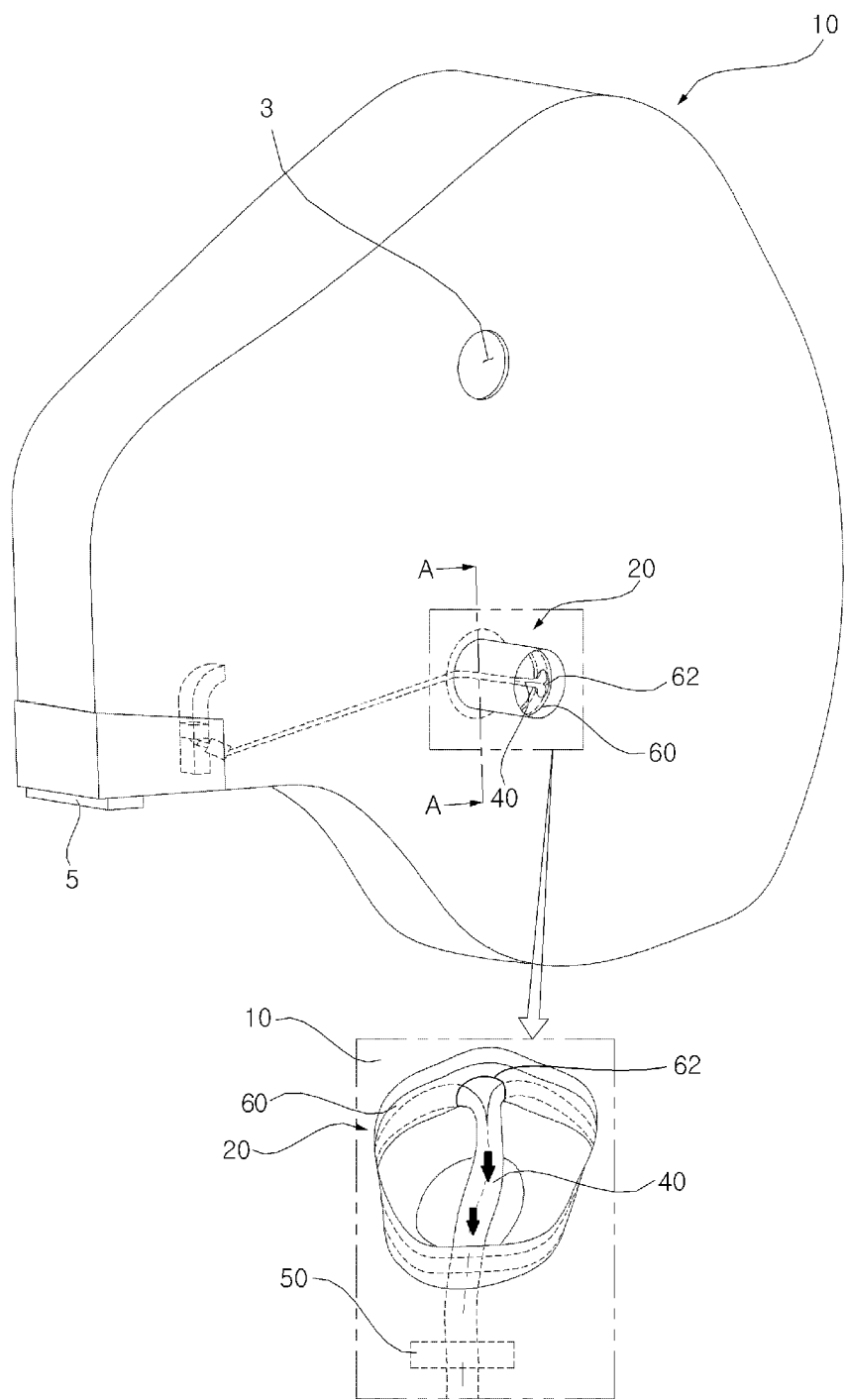
FIG. 2 is a perspective view illustrating a state before a vent hole cover shields a vent hole in an airbag for a vehicle according to the present invention.
Figure 3:
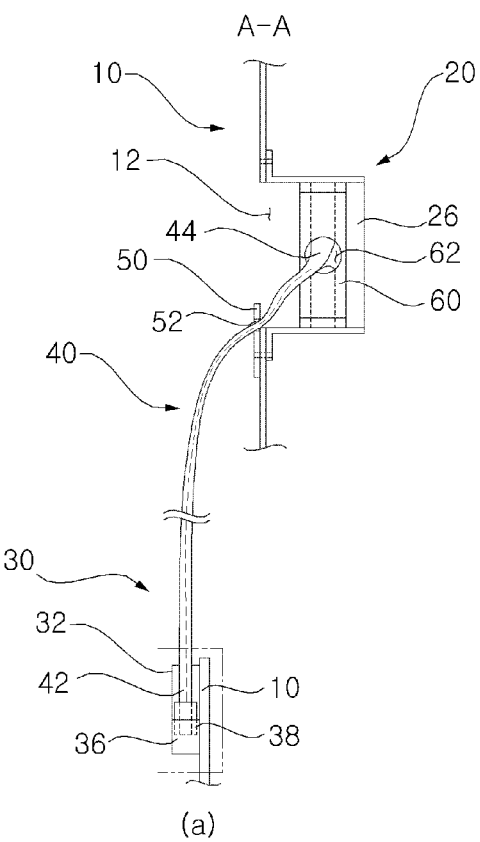
FIG. 3 is a cross-sectional view taken along line A-A of FIG. 2.
Figure 3:
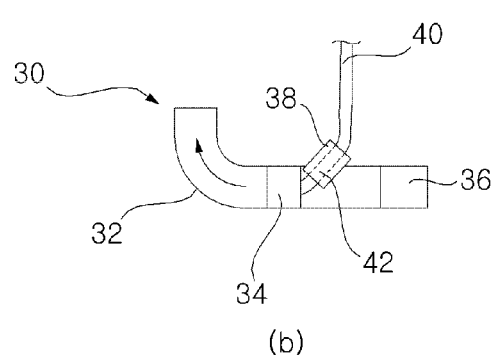
Figure 4:
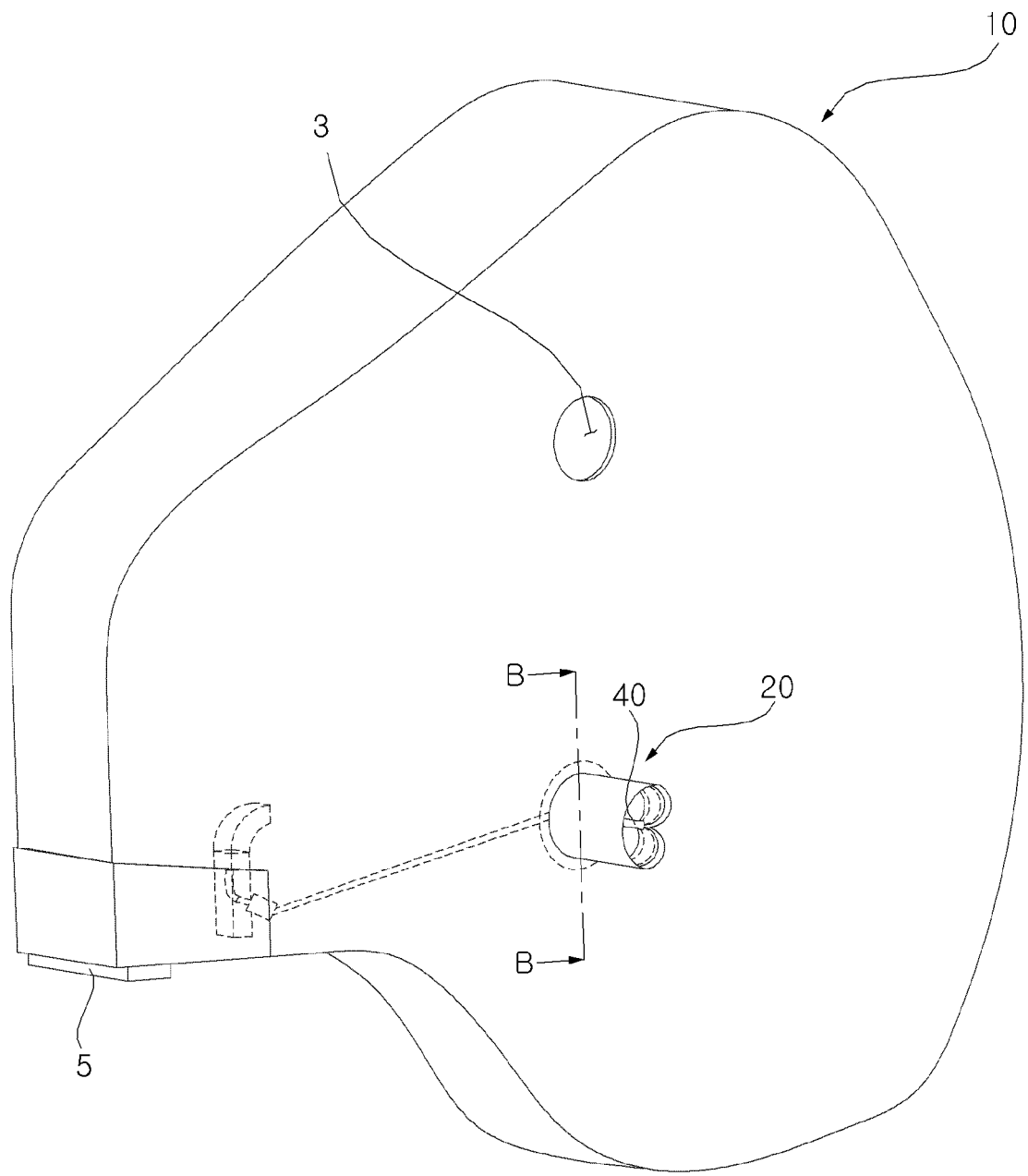
FIG. 4 is a perspective view illustrating a state in which the vent hole cover of FIG. 2 shields a part of the vent hole.
Figure 5:
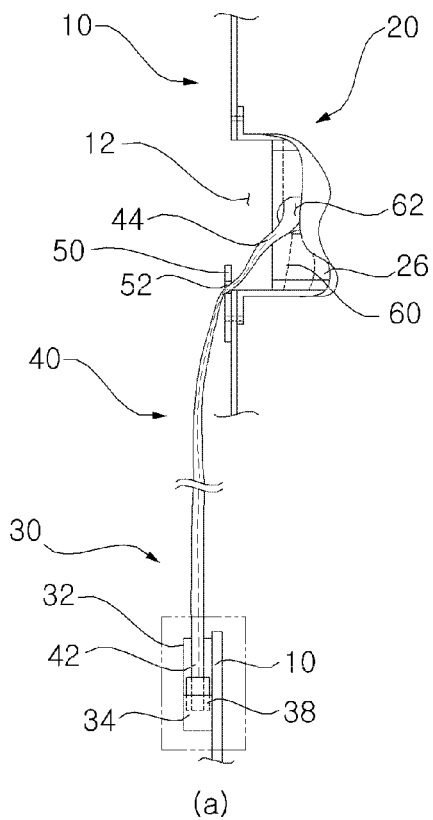
FIG. 5 is a cross-sectional view taken along line B-B of FIG. 4.
Figure 5:
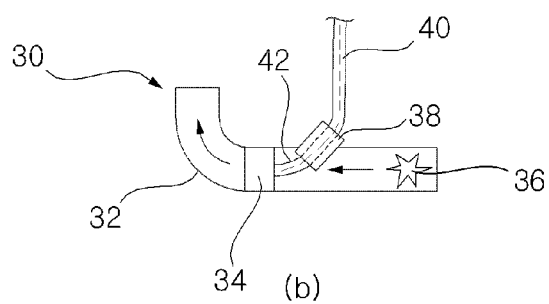
Figure 6:
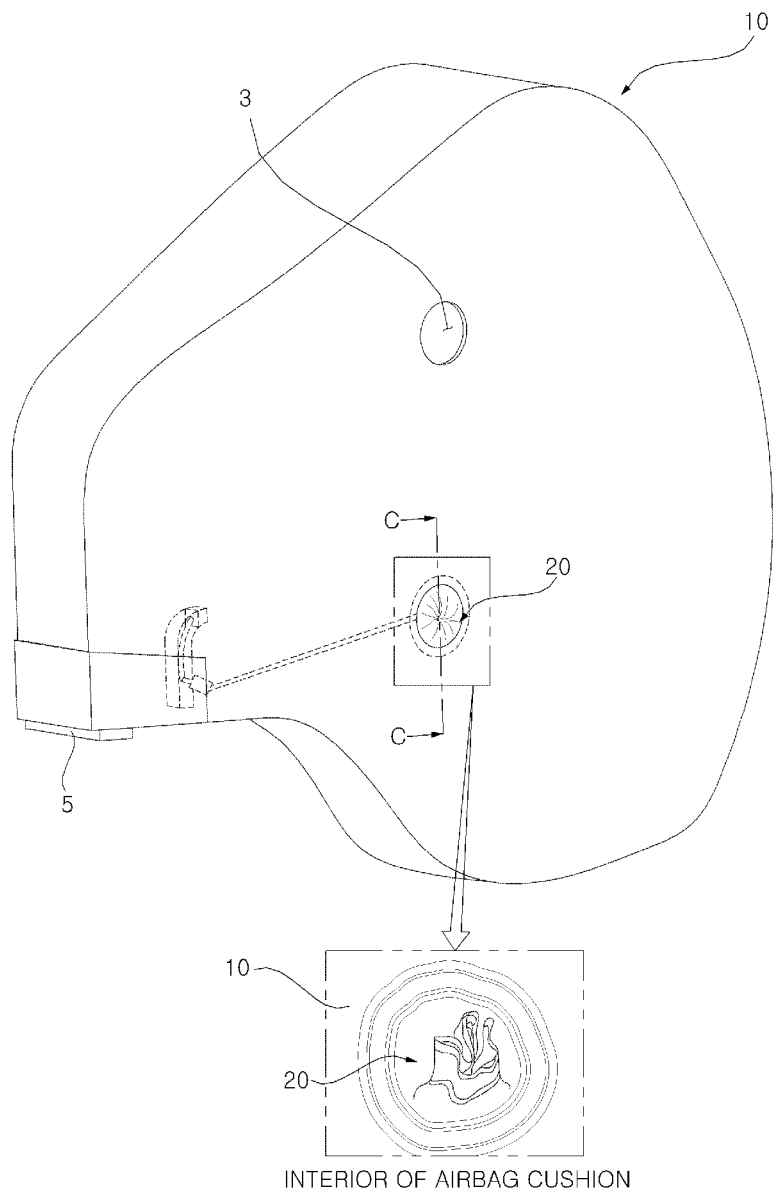
FIG. 6 is a perspective view illustrating a state in which the vent hole cover of FIG. 2 shields the vent hole.
Figure 7:
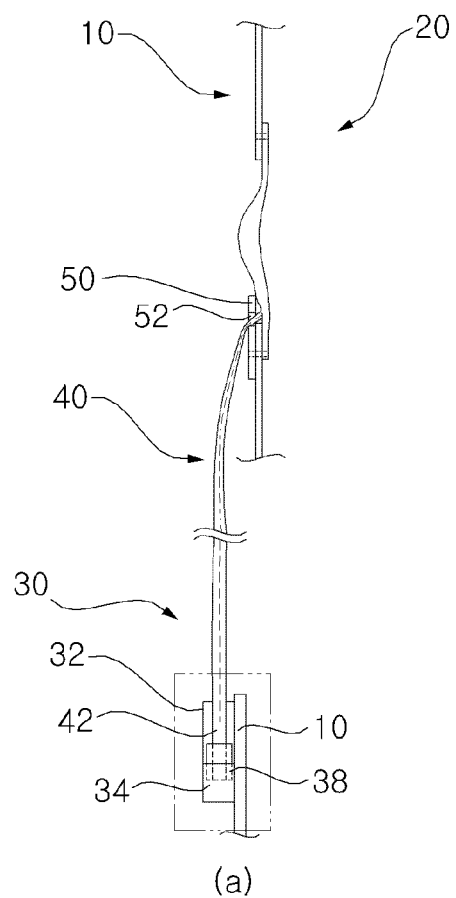
FIG. 7 is a cross-sectional view taken along line C-C of FIG. 6.
Figure 7:
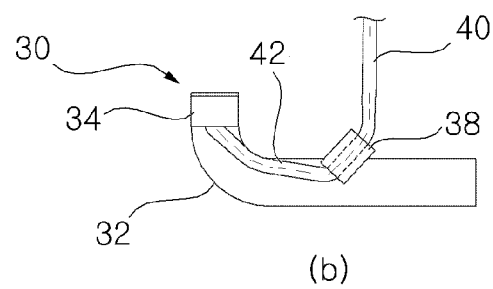

FIG. 2 is a perspective view illustrating a state before a vent hole cover shields a vent hole in an airbag for a vehicle according to the present invention, FIG. 3 is a cross-sectional view taken along line A-A of FIG. 2, FIG. 4 is a perspective view illustrating a state in which the vent hole cover of FIG. 2 shields a part of the vent hole, FIG. 5 is a cross-sectional view taken along line B-B of FIG. 4, FIG. 6 is a perspective view illustrating a state in which the vent hole cover of FIG. 2 shields the vent hole, and FIG. 7 is a cross-sectional view taken along line C-C of FIG. 6.

The exemplary embodiment of an airbag for a vehicle may be modified by a person with ordinary skill in the art to which the present invention pertains, and in the exemplary embodiment of the present invention, an airbag for a vehicle will be described.

FIG. 2 is a perspective view illustrating a state before the vent hole cover shields the vent hole in the airbag for a vehicle according to the present invention, and FIG. 3 is a cross-sectional view taken along line A-A of FIG. 2.

Referring to FIGS. 2 and 3, the airbag for a vehicle according to the present invention includes an inflator 5 which discharges high-pressure gas, an airbag cushion 10 which has a vent hole 12 so as to discharge a part of the high-pressure gas that flows in from the inflator 5, a vent hole cover 20 which is installed to shield the vent hole, and an operating unit 30 which allows the vent hole cover 20 to shield the vent hole 12.

The interior of the inflator 5 is filled with a gas generating medium that generates gas, and the gas generating medium ignites by a control signal from a controller so as to generate high-pressure gas at the time of a vehicle accident such as a collision, and the high-pressure gas is discharged into the airbag cushion 10 such that the airbag cushion 10 is deployed.

The airbag cushion 10 is made of a flexible material, and has the vent hole 12 so as to discharge a part of high-pressure gas. A plurality of vent holes 12 may be formed. In the present invention, it is described that the vent hole 12 is formed in a side surface of the airbag cushion 10, but the present invention is not limited thereto.

The operating unit 30 and the vent hole cover 20 are connected by a tether 40. The airbag cushion 10 in which the vent hole cover 20, the operating unit 30, and the tether 40 are installed is accommodated in an airbag housing (not illustrated) after being folded multiple times, and mounted in the vehicle.

The vent hole cover 20 is formed in a tube shape so that high-pressure gas with which the airbag cushion 10 is filled may be discharged to the outside before the vent hole 12 in the airbag cushion 10 is shielded. The vent hole cover 20 is installed outside the airbag cushion 10 by being sewn along an outer circumference of the vent hole 12.

The operating unit 30 is installed in the airbag cushion 10 so as to be adjacent to the inflator 5. In the exemplary embodiment of the present invention, the operating unit 30 is installed to be adjacent to the inflator 5, but the present invention is not limited thereto.

The operating unit 30 includes a piston 34 which is movably installed in a cylinder 32 and connected with the tether 40 so as to allow the vent hole cover 20 to shield the vent hole 12, and a piston moving means 36 which is installed in the cylinder 32 so as to move the piston 34. The cylinder 32 may be formed to have a curvature.

One side of the cylinder 32 is rectilinearly formed to accommodate the piston moving means 36 therein, and the other side of the cylinder 32 is formed to have a predetermined curvature. In the exemplary embodiment of the present invention, a part of the cylinder 32 is formed to have a curvature, but may be formed without having a curvature.

The tether 40 is connected to the piston 34.

The piston moving means 36 may be an explosive that causes an explosion by a non-illustrated control unit within a predetermined time after the airbag cushion 10 is deployed, and applies pressure to the piston 34.

Meanwhile, a guide member 38, which guides the tether 40 when the piston 34 is moved, may be installed in the cylinder 32. The tether 40 penetrates the guide member 38, and the guide member 38 is inclinedly installed in the cylinder 32 so as to guide the tether 40 in a direction in which the piston 34 is moved. Therefore, damage to the tether 40, which may occur when the guide member 38 is installed to be orthogonal to the cylinder 32, may be prevented.

Meanwhile, the tether 40 is movably installed along an inner circumferential surface 26 of the vent hole cover 20. According to the exemplary embodiment of the present invention, a tether cover 60 is attached to the inner circumferential surface 26 of the vent hole cover 20, and one end of the tether 40 is inserted into a tether cover hole 62 in the tether cover 60. The one end of the tether 40 is movably inserted along a circumference between the vent hole cover 62 and the tether cover 60, comes out of the tether cover hole 62, and then is connected to the piston 34 together with the other end of the tether 40. The tether cover 60 may be sewn on the inner circumferential surface 26 of the vent hole cover 20 so as to cover a part of the tether 40.

Therefore, when the piston 34 is moved, the tether 40 is pulled, and the vent hole cover 20 is tightened.

A support member 50 is installed at a region of the airbag cushion 10 which is positioned between the vent hole cover 20 and the guide member 50, and guides the tether 40 while supporting the tether 40. The support member 50 may have a hole 52 through which the tether 40 movably passes.

An operation of the airbag for a vehicle according to the present invention, which is configured as described above, will be described below.

FIG. 2 is a perspective view illustrating a state before the vent hole cover shields the vent hole in the airbag for a vehicle according to the present invention, and FIG. 3 is a cross-sectional view taken along line A-A of FIG. 2.

Referring to FIGS. 2 and 3, when an electronic control unit (ECU) (not illustrated) sends a signal to the inflator 5 at the time of a vehicle collision, the inflator 5 discharges high-pressure gas. The airbag cushion 10 is deployed by the high-pressure gas discharged from the inflator 5.

FIG. 4 is a perspective view illustrating a state in which the vent hole cover of FIG. 2 shields a part of the vent hole, and FIG. 5 is a cross-sectional view taken along line B-B of FIG. 4.

Referring to FIGS. 4 and 5, the operating unit 30 is operated when a predetermined time has passed after the inflator 5 is operated. That is, when a predetermined time has passed after the inflator 5 is operated by the non-illustrated control unit, the explosive, which is the piston moving means 36 of the operating unit 30, explodes, and the piston 34 is moved by pressure caused by the explosion, such that the tether 40 is pulled, and then the inner circumference of the vent hole cover 20 begins to be tightened.

FIG. 6 is a perspective view illustrating a state in which the vent hole cover of FIG. 2 shields the vent hole, and FIG. 7 is a cross-sectional view taken along line C-C of FIG. 6.

Referring to FIGS. 6 and 7, when a predetermined time has passed after the explosive 36 explodes, the piston 34 is moved to the one end of the cylinder 32, and the vent hole cover 20 is completely tightened such that the airbag cushion 10 is shielded.

Therefore, when a time point when the explosive explodes is set in order to control a time at which the operating unit 30 is operated, and the explosive ignites at the set time, the vent hole cover 20 shields the vent hole 12 such that stability and controllability of the airbag deployment are improved, and it is possible to precisely control the operation of shielding the vent hole, thereby reducing severity of head and neck injuries to the occupant. In addition, maximum score items may be obtained at the time of performing tests in accordance with the United States New Car Assessment Program (US-NCAP), thereby improving stability and reliability of products.

While the exemplary embodiments of the present invention have been illustrated and described above, the present invention is not limited to the aforementioned specific exemplary embodiments, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An airbag for a vehicle, comprising:
an inflator which discharges high-pressure gas;
an airbag cushion which has a vent hole so as to discharge a portion of high-pressure gas that flows in from the inflator;
a vent hole cover which is installed to open or shield the vent hole; and
an operating unit which allows the vent hole cover to shield the vent hole when a predetermined time has passed from beginning of deploying the airbag cushion,
wherein the vent hole cover opens the vent hole at a first position before the operating unit is activated and shields the vent hole at a second position after the operating unit is activated,
wherein the vent hole cover is formed in a tube shape so that high-pressure gas with which the airbag cushion is filled is discharged to the outside through the vent hole before the vent hole in the airbag cushion is shielded.

2. An airbag for a vehicle, comprising:
an inflator which discharges high-pressure gas;
an airbag cushion which has a vent hole so as to discharge a portion of high-pressure gas that flows in from the inflator;
a vent hole cover which is installed to shield the vent hole; and
an operating unit which allows the vent hole cover to shield the vent hole when a predetermined time has passed from beginning of deploying the airbag cushion,
wherein the operating unit includes:
a cylinder;
a piston which is movably installed in the cylinder so as to allow the vent hole cover to shield the vent hole; and
a piston moving means which moves the piston.

3. The airbag of claim 2, wherein the piston moving means is an explosive embedded in the cylinder.

4. The airbag of claim 2, wherein the vent hole cover and the piston are connected by a tether.

5. The airbag of claim 4, wherein the tether is connected along a circumferential surface of the vent hole cover such that the tether tightens the vent hole cover by movement of the piston.

6. The airbag of claim 5, wherein a tether cover is attached to the vent hole cover, and a part of the tether is movably inserted between the vent hole cover and the tether cover.

7. The airbag of claim 6, wherein a tether hole is formed in the tether cover so that the tether passes through the tether hole.

8. The airbag of claim 4, wherein a guide member is installed in the cylinder so as to guide the tether in a direction in which the piston is moved.

9. The airbag of claim 8, wherein the guide member is inclinedly installed toward the direction in which the piston is moved.

10. The airbag of claim 8, wherein a support member is attached at a region of the airbag cushion which is positioned between the vent hole cover and the guide member, and guides the tether while supporting the tether.

11. The airbag of claim 10, wherein the support member has a hole through which the tether movably passes.

12. The airbag of claim 1, wherein the vent hole cover is installed by being sewn on a region of the airbag cushion which corresponds to an outer circumference of the vent hole.

* * * * *